Figure 1:
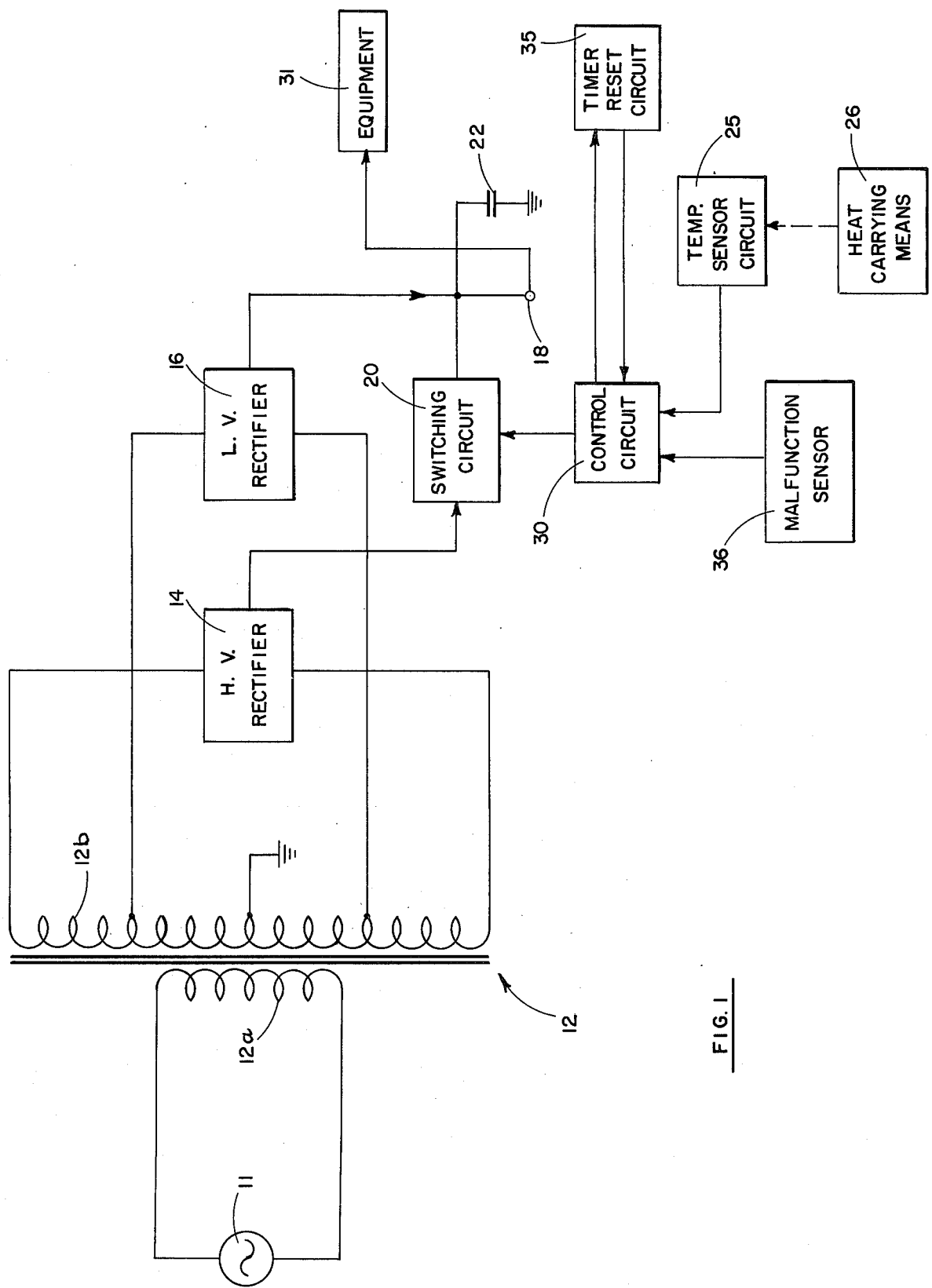

United States Patent [19]

Bird et al.

[11] 3,987,342

[45] Oct. 19, 1976

[54] PROTECTIVE CIRCUIT UTILIZING MULTILEVEL POWER SUPPLY OUTPUT

[75] Inventors: Robert J. Bird, Citrus Heights; Paul S. Rumbaugh, Santa Ana, both of Calif.

[73] Assignee: Altec Corporation, Anaheim, Calif.

[22] Filed: Nov. 24, 1975

[21] Appl. No.: 634,789

[52] U.S. Cl. .............................. 317/41; 317/33 SC; 317/22; 323/69; 330/23; 330/207 P; 307/86
[51] Int. Cl.² .................... H02H 7/20; H02H 5/04
[58] Field of Search .............. 317/41, 40 R, 33 SC, 317/22; 323/68, 69; 330/23, 207 P; 307/202 R, 75, 86, 44; 320/35; 357/28; 321/19

[56] References Cited
UNITED STATES PATENTS

| | | | |
|---|---|---|---|
| 3,480,852 | 11/1969 | Hung ............................... | 323/68 X |
| 3,522,480 | 8/1970 | Routh et al. ...................... | 317/41 X |
| 3,530,359 | 9/1970 | Grist ................................ | 307/75 X |
| 3,564,293 | 2/1971 | Mungenast ....................... | 317/41 X |
| 3,646,397 | 2/1972 | Ruthenberg et al. ............. | 317/41 X |
| 3,651,379 | 3/1972 | Moisand et al. .................. | 317/41 |
| 3,708,720 | 1/1973 | Whitney et al. .................. | 317/41 X |
| 3,935,513 | 1/1976 | Suzuki ............................. | 317/41 X |
| 3,942,075 | 3/1976 | Maran et al. ..................... | 317/41 |

*Primary Examiner*—J D Miller
*Assistant Examiner*—Patrick R. Salce
*Attorney, Agent, or Firm*—Edward A. Sokolski

[57] ABSTRACT

A power supply has both high and low voltage power sources connected to a common output terminal. A switching circuit is connected between the high voltage source and this terminal, the switching circuit being controlled by a control circuit. The control circuit operates in response to malfunction and temperature sensors when these sensors have outputs indicative of equipment operating conditions outside of predetermined ranges for each of the sensed parameters. When the control circuit is not being actuated by an output from one of the sensors, the switching circuit is actuated to connect the high voltage output to the output terminal. In the event, however, that one of the temperature or malfunction sensors senses a condition outside of range, the control circuit is actuated, thereby deactuating the switching circuit to remove the high voltage output from the output terminal, leaving low voltage output. The control circuit operates in conjunction with a timer-reset circuit which resets the control circuit cyclically after a predetermined timing cycle. With each resetting, the control circuit will be reactuated by one of the sensors only if an out-of-range condition still exists. However, if after any resetting of the control circuit, there no longer is an out-of-range parameter being sensed, the control circuit will remain deactuated so as to restore high voltage output.

7 Claims, 2 Drawing Figures

PROTECTIVE CIRCUIT UTILIZING MULTILEVEL POWER SUPPLY OUTPUT

This invention relates to electronic power supplies, and more particularly to such a power supply having a protective circuit for reducing the voltage output thereof when predetermined adverse operating conditions arise.

Power supply protective circuits generally take the form of fuses, circuit breakers or other such cutout circuits which completely remove the power supply output from the equipment it is supplying in the event of an overload, overheating or malfunction condition. This type of circuit has the disadvantage of completely disenabling the operation of the equipment, which is particularly disadvantageous where such equipment is being operated in commercial or public service, such as for example in the case of public address systems, auditorium and theater amplifiers and the like. In most instances, the malfunction condition is such that continued operation at reduced voltage would provide acceptable operation until the necessary repairs could be effected. Thus, the total interruption of operation is oftentimes unnecessary.

Certain prior art devices have been developed which obviate the complete cessation of operation in the face of overheating, overload or other malfunction conditions. In certain of these prior art devices, this end result is achieved by increasing the negative bias on the output stage of the amplifier so as to limit the current output thereof. Other prior art approaches to this problem involve the automatic reduction of the signal input level. In both of these prior art approaches, the full normal operating voltage is still applied to the amplifier which continues the dissipation of heat energy and loading beyond that which would be required for acceptable operation. Thus, in these prior art approaches, the overloading and/or overheating condition is not alleviated to the extent possible with the present invention. Further, in many of these prior art devices means are not provided for automatically restoring normal operation as soon as the overheating or other malfunction condition disappears.

The present invention overcomes the aforementioned shortcomings of the prior art by automatically reducing the power supply voltage for the entire equipment in response to a sensed overheating or other malfunction condition. Further, in the device of the invention, the malfunction condition is cyclically automatically reevaluated and just as soon as this condition disappears, the power supply output is automatically restored to its normal value. Also, with the device of the present invention, it is possible to prevent an overheating condition from ever arising by lowering the voltage output for short periods of time when an overheating condition is approached, but prior to the time that such overheating reaches serious proportions.

It is therefore an object of this invention to provide an improved equipment protection circuit in which the equipment may be continued in operation at reduced power under certain malfunction conditions.

It is a further object of this invention to provide an overheating and malfunction protective system in which the heating and malfunction conditions are cyclically reevaluated.

It is still a further object of this invention to obviate the need for shutting down equipment when certain overheating and malfunction conditions occur.

Figure 2:
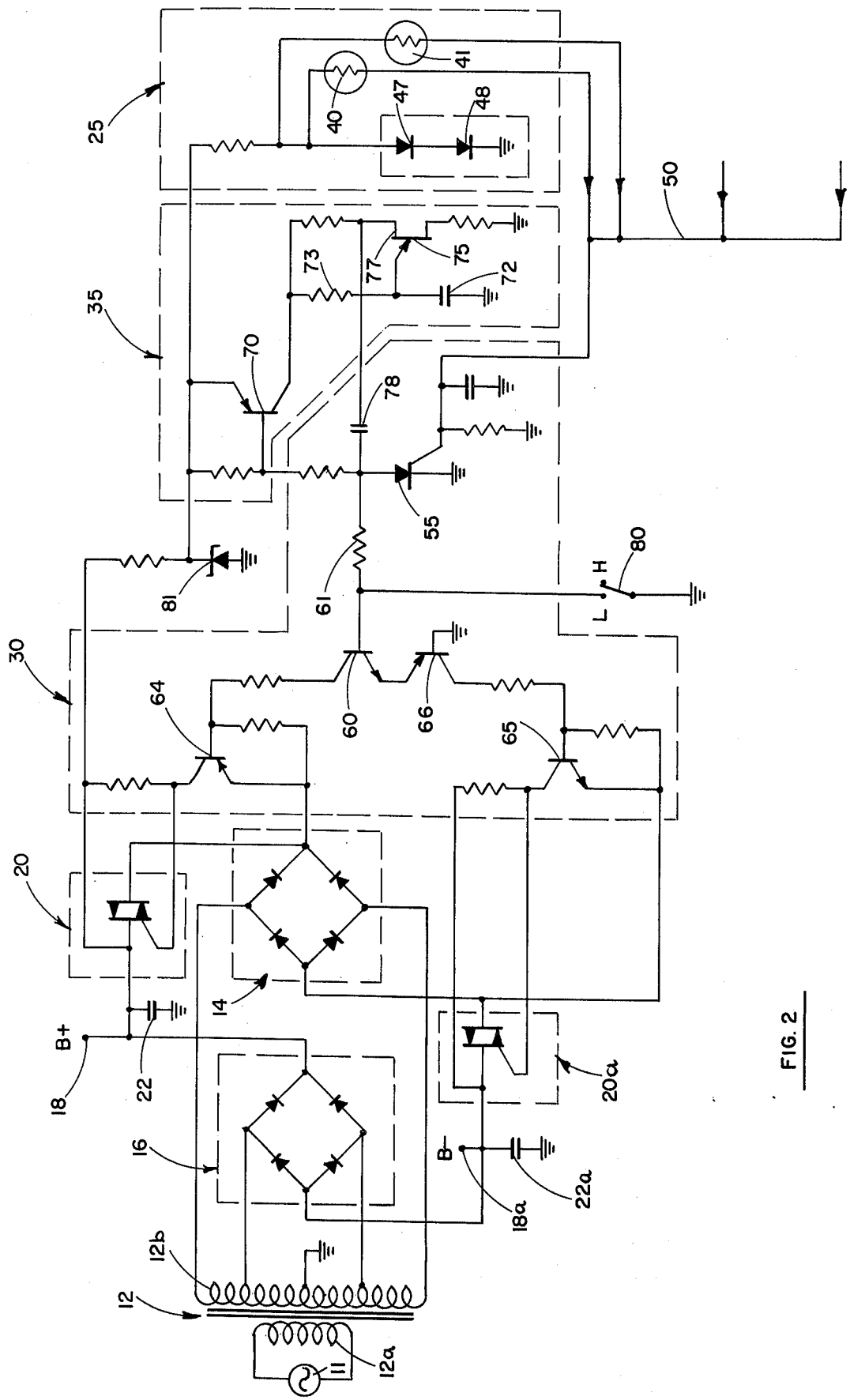

Other objects of this invention will become apparent as the description proceeds in connection with the accompanying drawings, of which:

FIG. 1 is a functional block diagram of a preferred embodiment of the invention; and FIG. 2 is a schematic drawing of an implementation of the preferred embodiment.

Briefly described, the system of the invention is as follows: A low voltage output of a power supply is connected directly to the power supply output terminal, while a high voltage output is connected to this same terminal through a switching circuit. The switching circuit is operated in response to a control circuit which in turn functions in response to temperature and malfunction sensors. When the temperature condition being measured is within an acceptable range and no malfunctioning condition is being sensed, the control circuit provides a signal which actuates the switching circuit, thereby connecting the high voltage to the output terminal. In the event, however, of a malfunction condition, or in the event that the temperature condition being sensed rises above acceptable limits, the control circuit is actuated thereby operating the switching circuit so as to remove the high voltage from the output terminal. Under these conditions, only low voltage is provided to the equipment receiving power from the power supply. A timer-reset circuit is connected to the control circuit and cyclically resets the control circuit, i.e., causes the control circuit to operate the switching circuit so as to provide high voltage for the output terminal. After the control circuit has been so reset, if one or the other of the sensors is still indicating improper operating conditions, the control circuit will again be triggered to remove the high voltage from the output terminal. In this manner, the output of the power supply is automatically reduced to a value for acceptable operation whenever improper operation of the equipment is sensed, with an automatic remeasurement of the parameters utilized for determining such improper operation being made such that normal voltage will be restored as soon as such improper operation has terminated.

Referring now to FIG. 1, a preferred embodiment of the invention is schematically illustrated. AC power is fed from AC power source 11 to the primary winding 12a of power transformer 12. The secondary winding 12b of the transformer has a high voltage output which is fed to high voltage rectifier 14, and a low voltage output which is fed to low voltage rectifier 16. The rectified output of low voltage rectifier 16 is fed directly to output terminal 18 of the power supply. The rectified output of high voltage rectifier 14 is connected through switching circuit 20 to output terminal 18. Filter capacitor 22 is also connected to output terminal 18. Temperature sensor circuit 25 is placed to sense the temperature of heat carrying means 26. Heat carrying means 26 may, for example, comprise a heat sink or the casing of a power transistor in the equipment receiving power from the supply, or may comprise the air at a particular location in such equipment.

The temperatuure sensor circuit 25 is connected to control circuit 30 and operates to actuate this circuit whenever the sensed temperature exceeds a predetermined value. When so actuated, control circuit 30 operates switching circuit 20, causing this circuit to remove the output of high voltage rectifier 14 from output terminal 18, leaving only the low voltage output to the equipment 31 receiving the power supply output. Whenever the control circuit 30 is being actuated, timer-reset circuit 35 cyclically operates to reset the control circuit at the end of each successive timing cycle thereof. Thus, control circuit 30 is periodically reset to its non-actuated condition such that if the output of temperature sensor 25 or malfunction sensor 36 both have outputs indicative of normal operation, the control circuit will remain deactuated so as to enable switching circuit 20 to restore the high voltage output to the output terminal. However, in the event that improper operating conditions still exist, the control circuit will again be actuated to remove the high voltage from the output terminal.

Malfunction sensor 36 may comprise a sensor which measures any equipment malfunction which need be monitored, such as an overload condition. The malfunction sensor thus, in the event of a malfunction, actuates the control circuit in the same manner as described for the temperature sensor circuit.

In an operative embodiment of the invention, the low voltage provides approximately one-third of the power provided with the high voltage connected to the output terminal. This reduction of power has been found to maintain reasonably acceptable operation of sound equipment with which the power supply is utilized. In view of the fact that the operating conditions of the equipment being sensed by the sensors are automatically reevaluated on a cyclical basis, the equipment is automatically restored to normal operation just as soon as the improper operating condition has been alleviated.

Referring now to FIG. 2, an implementation of the preferred embodiment is schematically illustrated. The primary winding 12a of transformer 12 is connected to AC power source 11. The higher voltage output of windings 12b is fed to high voltage rectifier 14 while the lower voltage output of windings 12b is fed to low voltage rectifier 16. Typically, the higher voltage output may be of the order of 120 volts, while the lower voltage output may be of the order of 70 volts. In the implementation of FIG. 2, rectifiers 14 and 16 comprise bridge rectifier circuits which provide positive voltage outputs with respect to ground at terminal 18 and across capacitor 22, and negative outputs with respect to ground at terminal 18a and across capacitor 22a. The invention of course could be implemented to equal advantage with different types of rectifiers and wherein there is only a single voltage output terminal (either positive or negative).

The positive output of high voltage rectifier 14 is connected through switch 20, which comprises a triac, to terminal 18, while the negative output is fed through triac switching circuit 20a to terminal 18a. Under normal operating conditions the triacs 20 and 20a are both conducting, providing high voltage outputs from rectifier 14 to both terminals 18 and 18a.

A "normal" condition exists when the temperature being sensed by thermistors 40 and 41 are below a predetermined value and no malfunction signals are being fed from external sensing circuits to line 50. Thermistors 40 and 41 are placed in a temperature sensing area, i.e., an area where temperatures are to be measured and this measurement to be used as a criterion for reducing power. The thermistors would typically be located in such places as a heat sink, the casing of the power transformer, the casing of a power transistor or in a position where it would sense air temperature. Silicon diodes 47 and 48 are connected in series and provide a 1.2 volt bias voltage to the thermistors. When the temperatures sensed by both thermistors are below a predetermined value, the resistances of the thermistors are relatively high, such that insufficient voltage appears at the gate of silicon controlled rectifier 55 to trigger this SCR. The SCR is thus maintained in the "OFF" condition. The anode of SCR 55 is connected to the base of transistor 60 through resistor 61.

With the SCR at cut-off, a positive voltage is applied to the base of transistor 60 which maintains this transistor in the conductive state. With transistor 60 conductive, transistors 64, 65 and 66 are also maintained in conductive states. With transistor 64 conductive, the high voltage output of rectifier 14 is fed through this transistor to the gate of triac 20, thereby maintaining this triac conductive and providing a current path for the output of high voltage rectifier 14 to terminal 18. Similarly, triac 20a is maintained conductive by virtue of the conduction of transistor 65 to provide the negative high voltage to terminal 18a.

When the temperature of either thermistor 40 or 41 rises above the predetermined value, the resistance of either of these thermistors is lowered sufficiently so as to provide a high enough signal at the gate of SCR 55 to fire the SCR. When SCR 55 is fired, a signal close to ground potential is fed through resistor 61 to the base of transistor 60, driving this transistor to cut-off. This in turn results in transistors 64 and 65 being driven to cut-off. With transistors 64 and 65 at cut-off, triacs 20 and 20a are respectively brought to cut-off by virtue of the fact that the outputs of the high voltage rectifier 14 are no longer connected to the triac gates through the transistors. With triacs 20 and 20a at cut-off, the positive and negative outputs of high voltage rectifier 14 are removed from output terminals 18 and 18a respectively, leaving only the low voltage rectifier outputs at these terminals.

With the firing of SCR 55, the operation of the timer-reset circuit 35 is initiated in the following manner. With the firing of SCR 55 transistor 70, which has been in a cut-off condition up to this time by virtue of the biasing thereon, is driven to saturation. This provides charging current for capacitor 72 through resistor 73. The capacitor charges until the charge thereon reaches the firing potential of unijunction transistor 75, whereupon the unijunction fires. This causes a negative spike to be generated at base, B2 77. This negative spike passes through capacitor 78 and operates to at least momentarily drive SCR 55 to a non-conductive state. In the event that neither thermistor 40 nor 41 is now at an over-limit temperature, the SCR will remain at cut-off and will operate to cause transistors 60, 64, 65 and 66 and triacs 20 and 20a to all go to conduction thereby restoring high voltage output to terminals 18 and 18a. On the other hand, if the temperature is still over the predetermined limits, the SCR will be driven back to its conductive state by the signals fed thereto to one or the other of the thermistors, thereby maintaining low voltage operation of the power supply.

Typically, the time constant for the charging circuit formed by resistor 73 and capacitor 72 is chosen to provide firing unijunction 75 every 20 seconds during low voltage operation. Thus, a recheck of the temperature conditions (and/or malfunction conditions) is automatically made every 20 seconds, but as soon as the proper operating temperature has been reached, the high voltage output will be restored. Low voltage operation can also be initiated in response to control signals in the form of positive pulses or steady voltages fed to line 50. These signals operate to fire SCR 55 in the same manner as described for the thermistors. Such malfunction control signals may be generated by fault sensing circuits indicating short circuits or other malfunctions in the equipment.

Low voltage operation can also be manually initiated by means of control switch 80. Thus, when this switch is thrown to the low voltage position, "L", transistor 60 is driven to cut-off to remove the high voltage output from terminals 18 and 18a. In this manner, low voltage operation can be maintained if so desired. Zener diode 81 is used to maintain a constant twelve volt output to assure reliable operation of the timer circuit.

The system of this invention thus provides a simple yet highly reliable and effective means for assuring safe operation of equipment under abnormal operating conditions without necessitating shutdown of such equipment. Also, just as soon as normal operating conditions are restored, full power operation is immediately provided.

While the invention has been described and illustrated in detail, it is to be clearly understood that this is intended by way of illustration and example only and is not to be taken by way of limitation, the spirit and scope of this invention being limited only by the terms of the following claims.

We claim:

1. In a power supply for supplying power to a load, means for automatically reducing the power supplied to said load in the event that the value of at least one operating parameter of the power supply or load goes beyond a predetermined acceptable limit comprising:
   means for generating "high" and "low" voltage outputs, said low voltage output being connected directly to the load,
   switching circuit means interposed between the high voltage output and the load,
   means for sensing the value of said operating parameter and providing a signal in accordance therewith,
   control circuit means connected to receive the output of said sensing means for operating the switching means so as to disconnect the high voltage output from the load whenever said operating parameter is beyond said predetermined limit, and
   timer-reset circuit means having a timing cycle which is initiated in response to the output of the control circuit means for cyclically actuating the control circuit means so as to cause the high voltage output to be connected to the load whereby if said parameter is still beyond said limit, the control circuit means will again operate the switching circuit means to remove the high voltage from the load.

2. The power supply of claim 1 wherein one of said operating parameters is temperature and the sensing means comprises a temperature sensor circuit including a thermistor.

3. The power supply of claim 1 wherein said means for generating high and low voltage outputs comprises a power transformer having high and low voltage secondary windings, and a separate rectifier connected to receive the output of each of said windings.

4. The power supply of claim 1 wherein said switching circuit means comprises a triac.

5. The power supply of claim 1 wherein said control circuit means comprises an electronic switch which latches in the "ON" state to cause the switching means to disconnect the high voltage in response to a signal from said sensing means indicating that the operating parameter is beyond said limit and is cyclically driven to the "OFF" state in response to the output of said timer-reset circuit means to cause the high voltage to be reconnected to the load when said operating parameter returns to a value within said limit.

6. A power supply for supplying DC electrical power to a load comprising:
   an AC power source,
   means for transforming the output of said source to high and low AC voltages,
   means for rectifying said high and low voltage to DC, the low voltage DC being connected directly to the load,
   a switching circuit interconnecting the high voltage DC and the load,
   heat carrying means located in said power supply or said load, the temperature of which it is desired be kept below a predetermined limit,
   means for sensing the temperature of said heat carrying means,
   a control circuit connected to receive the output of said sensing means for operating the switching circuit to disconnect the high voltage DC from the load whenever the sensing means output indicates that said temperature has exceeded the predetermined limit, and
   a timer-reset circuit, having a timing cycle which is initiated by the output of the control circuit whenever the temperature limit is beyond said limit, for cyclically actuating the control circuit to cause the high voltage output to be connected to the load whereby if the temperature still exceeds said limit, the control circuit will again operate the switching circuit to remove the high voltage from the load.

7. The power supply of claim 6 wherein the control circuit comprises an electronic switch which latches in the "ON" state to cause the switching circuit to disconnect the high voltage from the load in response to a signal from the sensing means indicative of a temperature beyond the limit and is cyclically driven to the "OFF" state in response to the output of the timer-reset circuit to cause the high voltage to be automatically reconnected to the load when the temperature returns to a value within the limit.

* * * * *